United States Patent
Al-Anzi

(10) Patent No.: US 11,396,469 B2
(45) Date of Patent: Jul. 26, 2022

(54) ZERO POLLUTION HYBRID DESALINATION AND ENERGY PRODUCTION SYSTEM

(71) Applicant: KUWAIT UNIVERSITY, Safat (KW)

(72) Inventor: Bader Shafaqa Al-Anzi, Safat (KW)

(73) Assignee: KUWAIT UNIVERSITY, Safat (KW)

(*) Notice: Subject to any disclaimer, the term of this patent is extended or adjusted under 35 U.S.C. 154(b) by 58 days.

(21) Appl. No.: 17/137,289

(22) Filed: Dec. 29, 2020

(65) Prior Publication Data
US 2022/0204374 A1    Jun. 30, 2022

(51) Int. Cl.
| | | |
|---|---|---|
| C02F 9/00 | (2006.01) | |
| B01D 3/06 | (2006.01) | |
| B01D 53/26 | (2006.01) | |
| F02C 1/00 | (2006.01) | |
| C02F 1/04 | (2006.01) | |
| C02F 1/44 | (2006.01) | |

(Continued)

(52) U.S. Cl.
CPC ............ *C02F 9/00* (2013.01); *B01D 3/065* (2013.01); *B01D 53/263* (2013.01); *F02C 1/002* (2013.01); *C02F 1/048* (2013.01); *C02F 1/06* (2013.01); *C02F 1/441* (2013.01); *C02F 1/4693* (2013.01); *C02F 2103/08* (2013.01); *C02F 2303/10* (2013.01)

(58) Field of Classification Search
CPC ...................................................... H02S 10/12
USPC ............................ 203/10; 210/652; 204/194
See application file for complete search history.

(56) References Cited

U.S. PATENT DOCUMENTS

4,141,825 A * 2/1979 Conger .................. B01D 61/58
                                                     204/542
4,302,297 A    11/1981 Humiston
(Continued)

FOREIGN PATENT DOCUMENTS

| CN | 109869231 A | 6/2019 |
|---|---|---|
| ES | 2 609 073 A1 | 4/2017 |
| KR | 2015-0034543 A | 4/2015 |

OTHER PUBLICATIONS

Al-Karaghouli et al., "Renewable Energy Opportunities in Water Desalination," Desalination, Trends and Technologies, Feb. 28, 2011.

*Primary Examiner* — Nina Bhat
(74) *Attorney, Agent, or Firm* — Nath, Goldberg & Meyer; Richard C. Litman

(57) ABSTRACT

The hybrid desalination and energy production system includes a desalination system for separating seawater into purified water and brine, an electrodialysis system for treating the brine and outputting low salinity water, a hypersaline brine solution, and $H_2$ gas; an evaporator for treating the hypersaline brine solution and outputting salt and water vapor; a superheater for treating the water vapor and outputting a superheated water vapor; a turbine for receiving the superheated water vapor to generate energy; a gas scrubber for receiving the $H_2$ gas from the electrodialysis system and producing dry hydrogen; and a hydrogen cell for receiving the dry hydrogen and outputting energy. A condenser converts the vapor into condensate and low salinity water. A desalinated water collection tank receives the desalinated or low salinity water. A pressure retarded osmosis system receives the brine, the low salinity water, and condensate from the condenser to produce dilute brine.

20 Claims, 1 Drawing Sheet

(51) Int. Cl.
  *C02F 1/469* (2006.01)
  *C02F 103/08* (2006.01)
  *C02F 1/06* (2006.01)

(56) References Cited

U.S. PATENT DOCUMENTS

| | | | |
|---|---|---|---|
| 9,045,351 B2 | 6/2015 | Wallace | |
| 9,227,853 B2* | 1/2016 | Ghosh | F01K 11/00 |
| 9,266,065 B2* | 2/2016 | McGinnis | C02F 1/20 |
| 10,626,037 B2* | 4/2020 | Lienhard | B01D 61/58 |
| 10,669,168 B2* | 6/2020 | Gao | C02F 9/00 |
| 10,717,044 B1* | 7/2020 | Kalamaras | B01D 53/62 |
| 11,014,016 B2* | 5/2021 | Dotter | B01D 1/0035 |
| 2010/0051450 A1* | 3/2010 | Murahara | A01K 63/042 |
| | | | 204/240 |
| 2013/0327711 A1* | 12/2013 | Hickenbottom | C02F 1/447 |
| | | | 210/636 |
| 2014/0075945 A1 | 3/2014 | Matsumura | |
| 2015/0251924 A1 | 9/2015 | Li et al. | |
| 2020/0024159 A1* | 1/2020 | Parkey | H01M 8/188 |
| 2020/0363108 A1* | 11/2020 | Novek | F25B 15/14 |

* cited by examiner

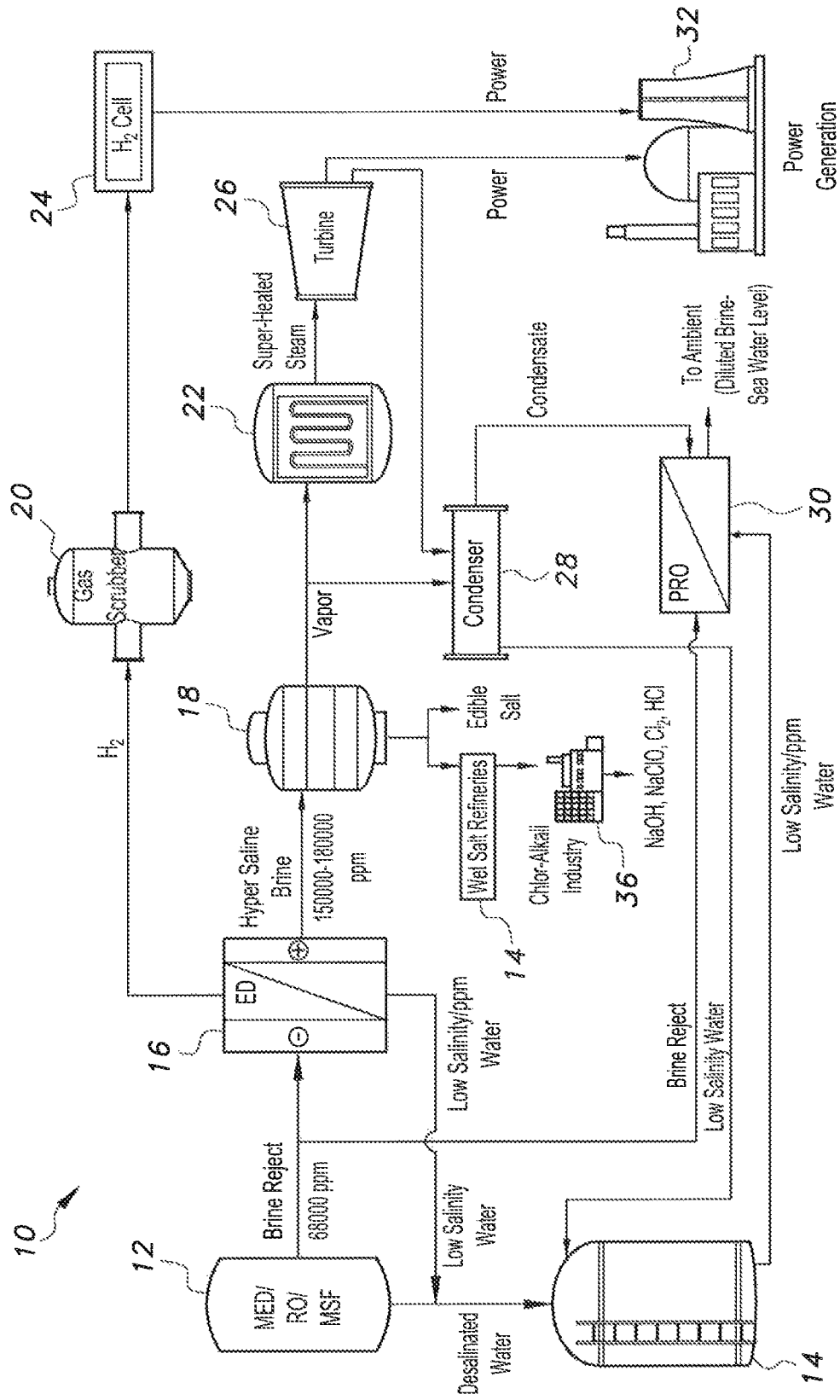

ZERO POLLUTION HYBRID DESALINATION AND ENERGY PRODUCTION SYSTEM

BACKGROUND OF THE INVENTION

1. Field of the Invention

The present disclosure relates to water treatment and desalination, and particularly, to a zero pollution hybrid desalination and energy production system.

2. Description of the Related Art

With the continuous increase in the world's population, pollution of freshwater sources, and limited freshwater resources, water scarcity has become a global concern. By 2025, two thirds of the planet's population will face serious water shortages and live in water stressed conditions. Humans generally consume relatively large amounts of water throughout the day. In certain areas of the world, such as developing nations, access to clean fresh water can be problematic. Further, a large amount of water that is available on the planet is in the form of saltwater. Unfortunately, this saltwater is not suitable for human consumption because of its inherently high salt content which can cause dehydration when consumed. Further, saltwater cannot be used for irrigation purposes as in agriculture. In order to overcome such water shortages, most of the countries in the world have employed desalination technologies to replenish their water resources to reduce the deficit between supply and demand. Currently, there are about 15,906 desalination plants around the world, with 48% of them employed in the Middle East and North Africa.

All desalination plants discharge high salinity seawater as a waste stream referred to as brine. Brine reject or brine blow-down into seawater may contain other contaminants such as chlorine or chromium, resulting in a negative localized environmental impact to proximal coastal regions. Changes in sea water salinity brings about many challenges that negatively impact marine life, fauna and flora in different ways. Dissolved oxygen depletion (hypoxia) is one of the threats posed by continuous discharge of brine into seawater. Residues of chemical additives used to improve desalination performance and encompassed in the reject brine usually end up in seawater as well. This increases the amount of $CaCo_3$, $CaSO_4$, and other elements in seawater to twice its normal level, resulting in high total alkalinity. Thermal pollution is also one of the environmental impacts caused by brine discharge from desalination plants. While large scale desalination has been a mainstay in the world for many decades, management of high concentration brine has posed technological, economic, and environmental challenges.

Desalination is a process for extracting fresh water as a desired product from seawater or brackish water sources and rejecting a brine stream as an unwanted or waste by-product. Through desalination systems and processes, saltwater can be turned into potable drinking water for human consumption and for use in irrigation. Various systems and processes are known. Desalination methods are categorized into thermal based processes (multi-stage flash distillation, multiple effect distillation, vapor compression evaporation, cogeneration and solar water desalination) and membrane based processes (reverse osmosis, electrodialysis, and membrane distillation methods). One common form of thermal based desalination involves the boiling of saltwater, which in turn produces water vapor. This water vapor can then be condensed back into potable water. While this form of desalination can be relatively easy to implement, it can have difficulties in producing enough water to meet demand.

Other approaches and systems for desalination have certain drawbacks as well. For example, current desalination systems can be relatively expensive and complex, making their implementation difficult in many developing countries. Additionally, some desalination systems require manual operation, which can require continuous support. Therefore, it would be advantageous to provide a water desalination system that can be relatively easy to implement, operate, and maintain, which is readily affordable, and which can provide potable water for both consumption and irrigation purposes. Thus, a zero pollution hybridized desalination system addressing the aforementioned problems is desired.

SUMMARY OF THE INVENTION

The zero pollution hybridized desalination and energy production system is a fully integrated desalination system for desalinating seawater or the like and processing reject brine to release a dilute brine back into the sea. The system includes a desalination system for separating seawater into purified water and brine, an electrodialysis system for treating the brine and outputting low salinity water, a hypersaline brine solution, and $H_2$ gas; an evaporator for treating the hypersaline brine solution and outputting salt and water vapor; a superheater for treating the water vapor and outputting a superheated water vapor; a turbine for receiving the superheated water vapor to generate energy; a gas scrubber for receiving the $H_2$ gas from the electrodialysis (ED) system and producing dry hydrogen ($H_2$); and a hydrogen ($H_2$) cell for receiving the dry hydrogen ($H_2$) and outputting energy. A condenser can convert the vapor from the evaporator into condensate and low salinity water. A desalinated water collection tank receives desalinated water from the desalination system, low salinity water from the electrodialysis system and the condenser. A pressure retarded osmosis system (PRO) can receive the brine from the desalination system, low salinity water from the collection tank, and condensate from the condenser to produce dilute brine.

These and other features of the present system will become readily apparent up further review of the following specification and drawings.

BRIEF DESCRIPTION OF THE DRAWINGS

The sole drawing FIGURE is a diagram of the zero pollution hybridized system.

DETAILED DESCRIPTION OF THE PREFERRED EMBODIMENTS

Referring to the sole drawing FIGURE, a zero pollution hybrid desalination and energy production system 10 includes a desalination system 12 for receiving untreated fluid from a fluid source. The desalination system 10 is selected from at least one of a thermal-based system and a membrane-based system. In an embodiment, a seawater pump can transport untreated fluid, such as seawater, saltwater, fresh water, or any saltwater suitable for human consumption to the desalination system 12. It should be understood, however, that any suitable type of fluid may be treated, and the fluid intake may be adapted for receiving and transporting any suitable type of fluid. The source of the untreated fluid can be for instance, a reservoir, a lake, a sea, or any other suitable body of fluid. It should be noted that any suitable type of intake pump or the like may be utilized for delivering the untreated fluid into the system.

The zero pollution hybrid desalination and energy production system 10 includes numerous valves and pumps so that the fluid can be transported throughout the system. The desalination system 12 can include multi-stage flash distillation system, reverse osmosis system, multi-effect distillation system, a combination thereof or the like, for at last partially desalinating a volume of saltwater and outputting a treated fluid and a brine reject stream via output. It should be understood that any suitable pumps and valves may be utilized, and that the pumps and valves may be positioned in any suitable portion of the fluid path. It should also be noted that a portion of the filtered and and/or treated fluid output from the desalination system may have sufficient desired purity to be collected at this point, either via return line which leads to a collection tank 14, conduit or the like.

The desalination system 12 can include a membrane-based and/or a thermal desalination system. The desalination system 12 may include any conventional permeable membrane apparatus as is well known in reverse osmosis processes, for example. At the desalination system 12, the untreated fluid can undergo a desalination process so that an amount of potable or desalinated fluid can be recovered from the untreated fluid and an amount of brine reject can be passed to an electrodialysis system 16 under applied pressure from the desalination system's pump, and under control of the desalination system's valve.

The zero pollution hybrid system 10 also preferably includes a controller. The controller controls and directs the operation of the various components and the zero pollution hybrid system. For example, the controller can control fluid intake, the desalination system 10, the desalinated water collection tank 14, the electrodialysis system 16, the pressure retarded osmosis system 30, the evaporator 18, the condenser 28, the gas scrubber 20, the superheater 22, the $H_2$ cells 24, and the turbine 26. The controller can be any suitable controller, such as a programmable logic controller (PLA), a microcontroller, a personal computer, a tablet, or the like.

The controller can be implemented and programmed to automate the entire zero pollution hybrid system. Also included in the zero pollution hybrid system are various power generators. A battery can also be implemented in conjunction with the zero pollution hybrid system and said battery can be any commonly stored power source. The power generator and/or battery can power all of the components of the zero pollution hybrid system, including but not limited to the desalination system 10, the collection tank 14, the electrodialysis system 16, the evaporator 18, the gas scrubber 20, the pressure retarded osmosis system 30, the evaporator 18, the condenser 28, the gas scrubber 20, the superheater 22, the $H_2$ cell 24, and the turbine 26. Preferably, the battery is rechargeable.

The electrodialysis system 16 is configured to convert the brine reject stream to a hyper saline brine solution on the order of 150000-180000 ppm that is delivered to the evaporator 18, a low salinity water stream that is delivered to the desalinated water collection tank 14, and a 112 gas discharge that is delivered to the gas scrubber 20.

In an embodiment, the hyper saline brine stream entering the evaporator 18 can be heated or boiled in the evaporator vessel to provide a vapor. The vapor can be sent to a condenser 28 and to a superheater 22. Wet salt and edible salts can also be produced by the evaporator 18. The wet salt can be further processed by salt refineries 34 to produce NaOH, NaClO, $Cl_2$, and HCl for use in other industries 36.

The superheater 22 receives the water vapor and converts the saturated steam or wet steam into a superheated steam or dry steam. The superheater 22 can be either one of or a combination of a radiant, convection, or separately fired superheater 22. The steam can be passed through one or more long pipes that double back on themselves. Hot gases heat the wet steam inside the pipes they flow over to provide the superheated steam. The superheated steam (i.e. dry steam) can be passed to a turbine 26 where it can be used to generate electricity by a power generator 32.

A gas scrubber 20 receives the $H_2$ gas discharge from the electrodialysis system 16. The separated gas can be processed to achieve a desired purity according to various techniques known in the art. The hydrogen gas can be passed to an $H_2$ cell 24 and then to the power generation plant 32.

The condenser 28 receives vapor from the evaporator 18 and produces low salinity water and a condensate. The low salinity water from the cooling at the condenser 28 is directed via an outlet to the desalinated water collection tank 14. The condensate produced by the process is supplied to the pressure retarded osmosis system 30. The low salinity water is directed to the desalinated water collection tank 14. The condensate produced by the process is supplied to the pressure retarded osmosis system 30 for further diluting the reject stream from the desalination system 12. The pressure retarded osmosis system 30 can receive the brine reject stream through an input line where it is directed towards a first membrane filter using a first pump. The controller can adjust the pressure of the water delivered to the membrane filter which is monitored by a pressure sensor located in the line. The controller may also monitor salinity as determined from a salinity sensor also located in the line to adjust the pressure. The controller may also adjust the water pressure being delivered to the pump by measuring the differential pressure in the first membrane filter. Saltier water unusable for purification leaves the pressure retarded osmosis system 30 through a discharge line where the condensate is added to the water discharge and then diluted to ambient seawater concentration levels.

It is to be understood that the present system is not limited to the embodiments described above, but encompasses any and all embodiments within the scope of the following claims.

I claim:

1. A zero pollution hybrid desalination and energy production system, comprising:
   a desalination system for separating seawater into purified water and brine;
   an electrodialysis system for treating the brine and outputting low salinity water, a hypersaline brine solution, and $H_2$ gas;
   an evaporator for treating the hypersaline brine solution and outputting salt and water vapor;
   a superheater for treating the water vapor and outputting a superheated water vapor;
   a turbine for receiving the superheated water vapor to generate energy;
   a gas scrubber for receiving the $H_2$ gas from the electrodialysis system and producing dry hydrogen ($H_2$); and
   a hydrogen ($H_2$) cell for receiving the dry hydrogen ($H_2$) and outputting energy.

2. The system of claim 1, further comprising a power plant for receiving the energy generated by the turbine and the energy output from the hydrogen ($H_2$) cell.

3. The system of claim 1, wherein the desalination system comprises a thermal-based system for separating seawater into purified water and brine.

4. The system of claim 3, wherein the thermal-based system for separating seawater into purified water and brine is selected from the group consisting of a multistage flash distillation system, a multiple effect distillation system, a vapour compression evaporation system, a cogeneration system, and a solar water desalination system.

5. The system of claim 1 wherein the desalination system comprises a membrane-based system for separating seawater into purified water and brine.

6. The system of claim 5, wherein the membrane-based system for separating seawater into purified water and brine is selected from the group consisting of a reverse osmosis system, an electrodialysis system, and a membrane distillation system.

7. The system of claim 1, wherein the desalination system comprises a multistage flash system for separating seawater into purified water and a brine reject waste stream.

8. The system of claim 1, wherein the desalination system comprises a reverse osmosis system for separating seawater into purified water and a brine reject waste stream.

9. The system of claim 1, wherein the desalination system comprises a multi-effect desalination process for separating seawater into purified water and a brine reject waste stream.

10. The system of claim 1, further comprising a condenser for converting the water vapor from the evaporator into condensate and low salinity water.

11. The system of claim 1, wherein the salt produced by the evaporator includes edible salt and wet salt.

12. The system of claim 11, further comprising a refinery for refining the wet salt to produce NaOH, NaClO, $Cl_2$, and HCl.

13. The system of claim 1, further comprising a pressure retarded osmosis system for receiving the brine from the desalination system and condensate from the condenser to produce dilute brine.

14. A zero pollution hybrid desalination and energy production method for water desalination, comprising:
a desalination step for separating seawater into purified water and brine;
an electrodialysis step including treating the brine and outputting low salinity water, a hypersaline brine solution, and $H_2$ gas;
an evaporation step including treating the hypersaline brine solution and outputting salt and water vapor;
a superheating step including treating the water vapor and outputting a superheated water vapor;
a first energy-generation step including transferring the superheated water vapor to a turbine and moving the blades of the turbine to generate energy;
a gas scrubbing step including receiving $H_2$ gas from the electrodialysis system and producing dry hydrogen ($H_2$); and
a second energy-generation step including receiving dry hydrogen ($H_2$) and outputting energy.

15. The method of claim 14, further comprising transferring the energy generated by the first energy-generation step and the second energy-generation step to a power plant.

16. The method of claim 14, wherein the desalination step comprises using a thermal-based process for separating seawater into purified water and brine.

17. The method of claim 14, wherein the desalination step comprises using a membrane-based process for separating seawater into purified water and brine.

18. The method of claim 14, wherein the desalination step comprises using a multistage flash process for separating seawater into purified water and brine.

19. The method of claim 14, wherein the desalination step comprises using a reverse osmosis process for separating seawater into purified water and brine.

20. The method of claim 14, wherein the desalination step comprises using a multi-effect desalination process for separating seawater into purified water and brine.

* * * * *